3,135,869
SCANNING SYSTEM FOR PHOTOSENSITIVE LIGHT TRACKING DEVICE
Adolph H. Rosenthal, Forest Hills, N.Y., assignor to Kollsman Instrument Corporation, Elmhurst, N.Y., a corporation of New York
Filed Dec. 22, 1960, Ser. No. 77,654
1 Claim. (Cl. 250—235)

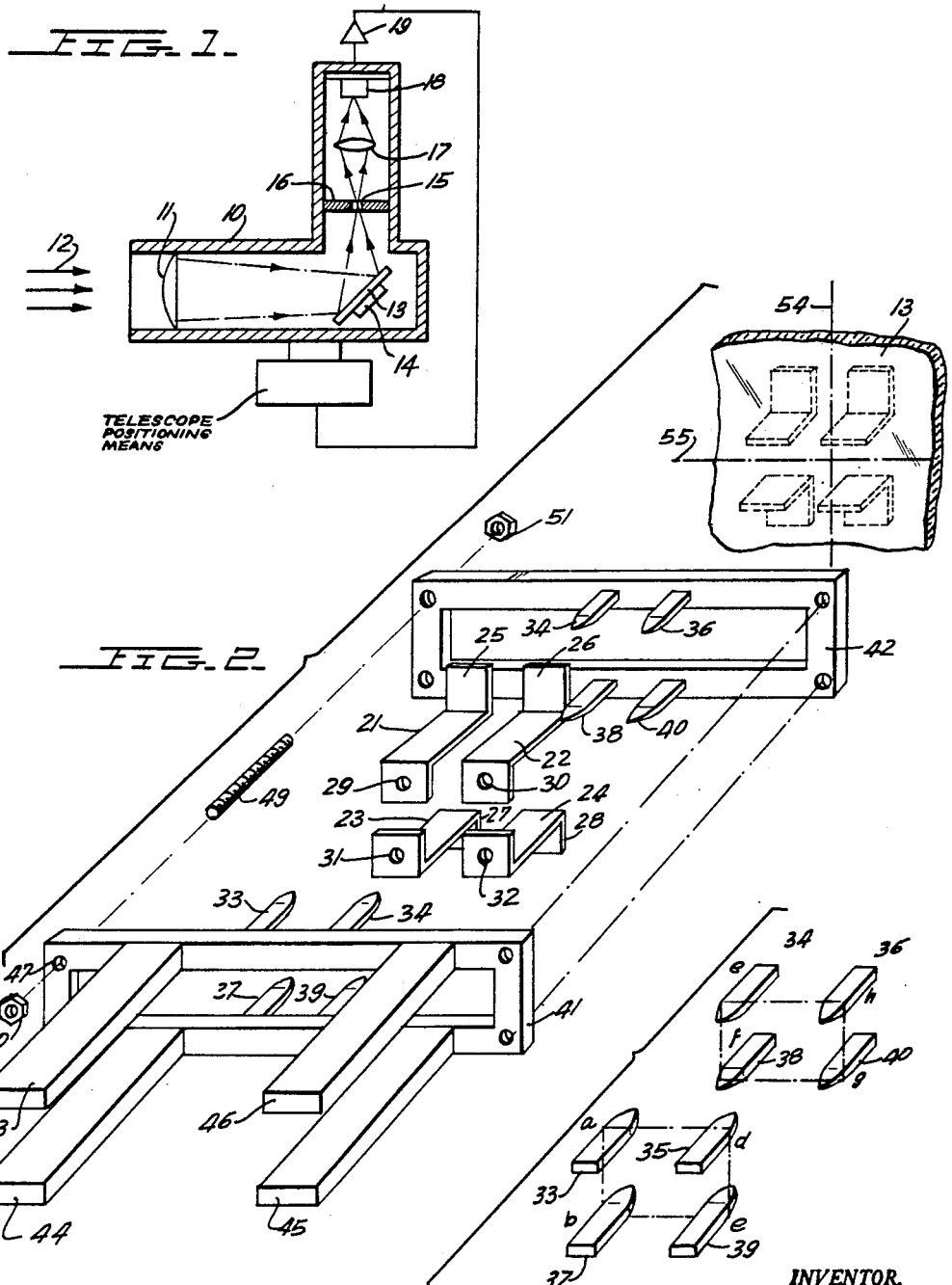

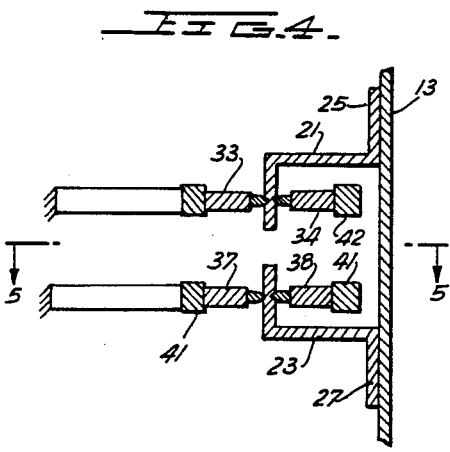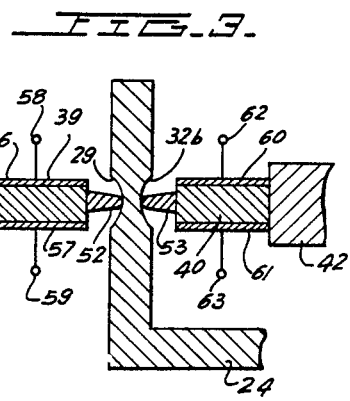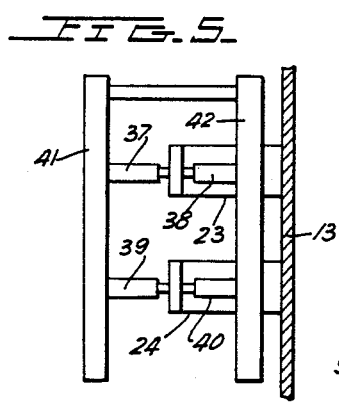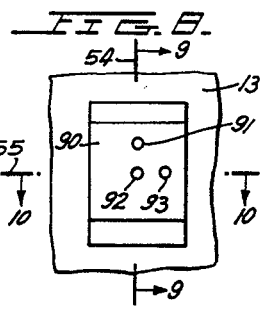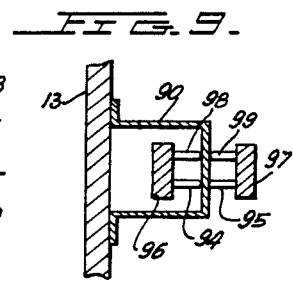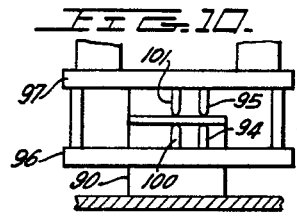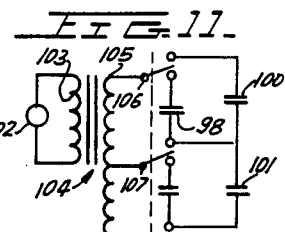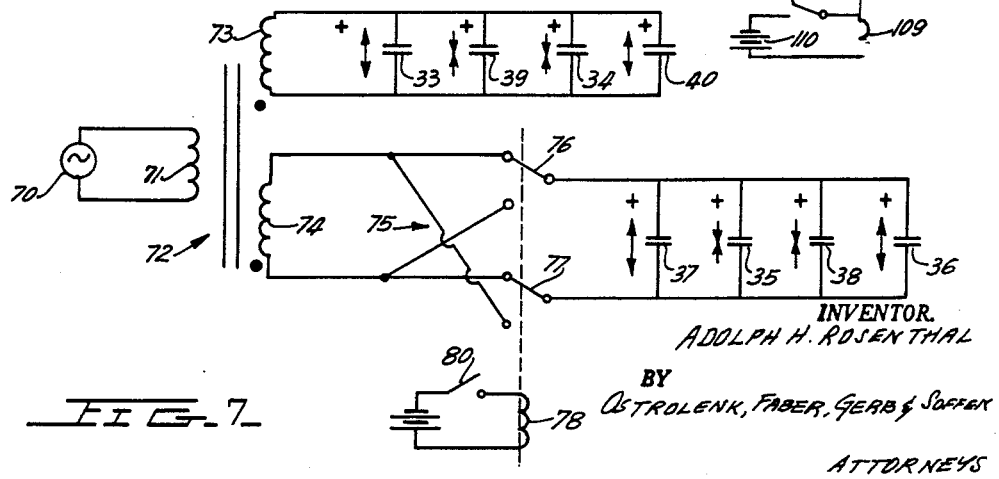
INVENTOR.
ADOLPH H. ROSENTHAL
BY OSTROLENK, FABER, GERB & SOFFEN
ATTORNEYS

My invention relates to a scanning system for light tracking devices, and more specifically relates to a light scanning system wherein the image is caused to move with simple harmonic motion with respect to a relatively fixed aperture, and the scanning mechanism is formed of solid members capable of withstanding forces due to extremely high accelerations and decelerations.

Light tracking devices are well known to the art, and are shown, for example, in U.S. Patent 2,905,828 to O'Maley et al., assigned to the assignee of the present invention. Scanning systems are provided for use in this type of light tracking device wherein the image formed by a telescope objective is scanned by an aperture which moves through the image with simple harmonic motion. When the image is at the center of the line being scanned by the aperture, and output signal is developed in a photo-sensing means which receives the scanned light which is at twice the frequency of the scanning frequency. When the image moves off the center of the scanning line, the output frequency of the light sensing means will include a component having a frequency equal to the frequency of the scanning mechanism. Thus, means are provided whereby a distinctive signal is generated when the image is at the center of the scanning line, and other distinctive signals are developed when the image moves off of this center position so that servo mechanism means may be activated to realign the telescope in an effort to keep the image at the central position.

Scanning systems of this type are shown in copending applications Serial Nos. 47,837 and 71,248 filed August 8, 1960, and November 23, 1960, respectively, each in the name of Zuckerbraun, as well as in my copending application Serial No. 77,199 filed December 20, 1960, all of which are assigned to the assignee of the present invention.

As set forth in the above applications, a plate having an aperture therein is physically moved with respect to a fixed image with simple harmonic motion as by mounting the plate at the end of the magnetizable reed which is moved by an adjacently positioned solenoid, or by mounting the aperture plate on the end of the tine of a tuning fork which is oscillated at its resonant frequency.

In all of these systems, a relatively large mass must be moved through a relatively large distance, so that the mechanical strength of the movable elements is limited, since they must be capable of being oscillated through an excursion having a relatively large length at a relatively high frequency.

The principle of the present invention is to provide a novel structure wherein an aperture is stationarily positioned within the telescope, and the image generated by the telescope is caused to move with respect to a fixed aperture. This concept which reverses the function of the previously proposed devices is advantageous over the previous devices in several respects. In the first instance, since a massless image only is to be caused to oscillate with simple harmonic motion, the means for causing this motion such as a reflecting mirror can have an extremely small mass and can be caused to move through relatively small distances with respect to the total end motion of the image in its focal plane. That is to say, there is an amplification of the motion of the image with respect to the motion of the reflecting body which causes the image to move.

Thus, while the identical result is obtained in causing the image to move with respect to a stationary aperture rather than retaining the image stationarily moving the aperture, I now move relatively light components through relatively small distances and thereby inherently simplify the mechanism and render it more reliable.

Furthermore, since only relatively small mechanical excursions are needed and relatively little power need be provided for moving, for example, a very small reflecting surface which will cause the image to oscillate, many desirable types of transducers can be used to cause this motion which, in view of the large mass and large excursion previously required, could not be used in the systems wherein the aperture itself is moved. Thus, with the present invention, a reflecting mirror which will cause the image to oscillate through a stationarily positioned aperture may be carried by a piezo-electric means which, when properly energized from an alternating voltage source, will cause the mirror to oscillate about a line parallel to one of its surfaces. This exceedingly simple and very rugged structure is then seen to provide scanning in a first direction for the light tracking system.

In obtaining scanning along another direction, a second piezoelectric element may be connected to the mirror in any desired manner so as to cause the mirror to oscillate about a line perpendicular to the above noted line, and also parallel to the mirror, so that the image will now move through the aperture in a perpendicular direction to the one previously established.

While a plurality of piezoelectric elements may be utilized to achieve oscillation of the mirror around two center lines which are at angles to one another, it may be possible to provide a unitary piezoelectric means characterized in that energization in a first mode will cause oscillation about the first line while energization according to a second mode will cause oscillation about a second line which is at an angle to the above mentioned first line.

The resulting operation of the system as pointed out above will proceed in exactly the same manner as discussed in above noted copending application Serial No. 47,837 filed August 8, 1960. Thus, in a preferred embodiment of the invention, a reflecting surface which is interposed between a telescope objective and a fixed aperture which is placed in front of the light-sensing source is caused to oscillate around a first line parallel to its surface. The image of the light gathered by the objective is focused in the plane of the aperture and is caused to scan across the aperture with the aperture at a central position or a position at which the image will fall when the reflecting surface is stationary.

The image will preferably move through a distance equal to four image diameters, as is the case in the above type systems. This scanning will develop output signals which can subsequently be applied to servo systems for maintaining the center of the scanning line at the stationary aperture. Thereafter, the reflecting plate is oscillated around a different axis so that an axis different from the first axis can be established by causing the image to scan past the fixed aperture at some predetermined angle to its first angle of scanning. If desired, however, the image could be rotated as disclosed in my above noted application Serial No. 77,199.

Accordingly, a primary object of this invention is to provide a novel scanning system for light tracking means.

Another object of this invention is to provide a novel scanning mechanism for light tracking systems which is light in weight and is highly reliable.

A further object of this invention is to provide a novel scanning mechanism for light tracking systems which executes exceedingly small mechanical motions.

Yet another object of this invention is to provide a novel scanning mechanism for light tracking systems which is compact and highly resistant to shock.

A further object of this invention is to provide a novel scanning mechanism for light tracking systems wherein an aperture is held in a fixed position, and the image of the body being tracked is moved with respect to the fixed aperture.

Yet a further object of this invention is to provide a novel scanning mechanism for light tracking systems wherein transducer means oscillate a reflecting or refracting surface upon which the image falls to cause the image to oscillate with simple harmonic motion.

These and other objects of my invention will become apparent from the following description when taken in connection with the drawings, in which:

FIGURE 1 shows a side cross-sectional view of a typical telescope for use as a light tracking device which can utilize the scanning means of the present invention.

FIGURE 2 is an exploded perspective view illustrating the manner in which the oscillating reflecting mirror is connected to a piezoelectric driving means.

FIGURE 3 is an enlarged cross-sectional view through one of the brackets for supporting the mirror, and illustrates the manner in which opposing piezoelectric elements support the bracket.

FIGURE 4 is a side cross-sectional view of the assembled bracket of FIGURE 2.

FIGURE 5 is a side cross-sectional view of the assembled bracket of FIGURE 4 when taken across the lines 5—5 of FIGURE 4.

FIGURE 6 is a perspective view of the piezoelectric elements of FIGURES 2 through 5, and illustrates the spatial relation ship of the piezoelectric elements.

FIGURE 7 is a schematic electrical diagram illustrating the manner in which the piezoelectric elements of FIGURE 6 may be energized to cause scanning in azimuth or altitude, depending upon the mode of energization of the piezoelectric elements.

FIGURE 8 is a front view of an alternate method of support for a mirror.

FIGURE 9 is a side cross-sectional view of FIGURE 8 taken across lines 9—9 of FIGURE 8.

FIGURE 10 is a side cross-sectional view of FIGURE 8 taken across lines 10—10 of FIGURE 8.

FIGURE 11 is a schematic circuit diagram of an energizing circuit for the piezoelectric elements of FIGURES 8 through 10.

Referring now to FIGURE 1, I have shown a telescope housing 10 which contains therein an objective means 11 which receives the radiation 12 of a radiating body which is to be tracked by the device. The objective lens 11 directs the light received rearwardly toward a reflecting surface 13 mounted within telescope housing 10 by a mounting means 14.

The reflecting surface 13 redirects the light rays which enter the telescope toward an aperture 15 in a plate 16 which is fixed with respect to housing 10. The plate 16 and its aperture 15 are located in the focal plane of objective 11, and the light passing through aperture 15 impinges upon a collecting means schematically shown as lens 17 which, in turn, focuses the light received through aperture 15 upon a photo-sensing means 18 which could, for example, be a photo-multiplier tube.

The output of photo-sensing means 18 is connected to an amplifier 19 which is, in turn, connected to a servo mechanism device 20 which is connected to housing 10. Servo mechanism device 20 is operable to adjust the position of housing 10 in accordance with the output signals of light-sensing means 18 in an effort to keep the telescope constantly pointed toward the light source being tracked.

In accordance with the present invention, the image of the body being tracked is caused to oscillate with respect to aperture 15 along a given line in order to develop a periodic output signal which contains information as to the alignment of the body being tracked and the telescope. This operation is fully described in above noted copending applications Serial Nos. 47,837 and 71,248 for the case where the aperture is moved with respect to a relatively fixed image of the light source, and the operation of the present device proceeds in an identical manner.

Thus, assuming that support means 14 of FIGURE 1 causes reflecting mirror 13 to oscillate so as to sweep the image across aperture 15 with a total excursion of approximately four image diameters with the aperture 15 having a diameter substantially equal to one image diameter, so long as the central or null position of the image falls on the center of aperture 15, the output signal generated by photo-sensing means 18 will have a fundamental component which is that twice the frequency of the frequency of oscillation of reflecting surface 13.

When, however, the image central position does not fall along the center of aperture 15, the output signal generated by photo-sensing means 18 will include a component which is equal to the frequency of oscillation of reflecting surface 13. The phase of this fundamental frequency component will be dependent upon whether the central position of oscillation falls to the left or to the right of aperture 15. Thus, the output signals generated and the phasing of those output signals which are at the frequency of oscillation of reflecting surface 13 will deliver information to the servo mechanism 20 which will operate to maintain the telescope frequency pointed toward the body being tracked, as by attempting to retain only the double frequency output of photo-sensing means 18 which indicates that the optical axis of the telescope is pointed directly toward the body being tracked.

Since, in accordance with the invention, it is only necessary to oscillate the reflecting surface 13, only a very light mass need be put in motion. Moreover, because of motion multiplication of the image position in its focal plane, the excursion of the motion of reflecting surface 13 can be quite small, even though the excursion of the image in its focal plane is relatively large.

As a typical example of a means for imparting oscillatory motion to reflecting surface 13, I have illustrated in FIGURES 2 through 5 a piezoelectric support structure which is light in weight and relatively rigid so as to be capable of withstanding exceedingly high forces due to rapid accelerations and decelerations.

Referring now to FIGURES 2-5, I have illustrated reflecting surface 13 as being comprised of a mirror which has four brackets 21, 22, 23 and 24 extending therefrom. Brackets 21—24 have rear legs such as rear legs 25, 26, 27 and 28 respectively which are cemented, as illustrated in dotted lines of FIGURE 2 and shown in FIGURES 4 and 5, to the rear surface of mirror 13. The brackets 21 through 24 further have upper legs which each contain opposing circular depressions on either side such as circular depressions 29, 30, 31 and 32 shown in FIGURE 2.

In FIGURE 3, I have shown an enlarged view of the front leg of bracket 24 where the opposed circular depressions 32a and 32b are specifically shown.

As will be seen hereinafter, the four brackets illustrated could be replaced by a single U-shaped plate having at least three opposing depressions.

In order to support the mirror 13 from brackets 21 through 24 and to drive the mirror in a first or second mode of oscillation, opposing pairs of piezoelectric elements 33—34, 35—36, 37—38 and 39—40 are provided for depressions 29 through 32 respectively. In order to support piezoelectric elements 33 through 40, I provide two frame supports 41 and 42 respectively. Frame 41, which is preferably of insulating material, has piezoelectric elements 33, 35, 37 and 39 secured thereto as by cementing, or any other desired manner, at the corners of a square. In a like manner, piezoelectric elements 34, 36, 38 and 40 are secured to frame member 42 at the corners of a square and opposing piezoelectric elements 33, 35, 37 and 39.

Frame member 41 then has extending legs 43, 44, 45 and 46 which serve to support the assembly from the telescope housing 10 (FIGURE 1). The frame members 41 and 42 are connected to one another at each of their corners, as shown in FIGURE 2 for the upper left-hand corner of the frames. Thus, each of the frames 41 and 42 has a tapped hole in each of its corners, such as tapped hole 47 of frame 41 and tapped hole 48 of frame 42. Each of the tapped holes in frame 41 are left-hand threads, while each of the tapped holes of frame 42 are right-hand threads.

A connecting bolt 49, which extends between tapped holes 47 and 48, has a left-hand tapped thread from its center to its front for engaging the left-hand tapped thread of hole 47, while the portion of bolt 49 from its center to the rear of FIGURE 2 has a right-hand thread for engaging the right-hand thread of tapped hole 48. In a like manner, a similar dual tapped bolt is provided for each of the other corners of frames 41 and 42.

In assembling the device, the bolts such as bolt 49 are threaded into their respective tapped openings 47 and 48 with the opposing piezoelectric elements being drawn toward one another and into their respective circular openings 39 through 32 of the bracket support members. Once an appropriate position is reached, nuts 50 and 51 are placed on the ends of bolt 49 extending through frames 41 and 42 respectively to retain the desired spacing between the frames, and thus the piezoelectric elements are secured to their brackets.

Each of the piezoelectric elements is terminated with a tapered nose portion having a radius of curvature which is smaller than the radius of curvature of the circular depressions in the bracket members. Thus, as seen in FIGURE 3 for the case of piezoelectric elements 39 and 40, they are provided with tapered nose members 52 and 53 respectively which engage circular depressions 32a and 32b at a point. Accordingly, a relatively frictionless pivotal contact is established between the opposing piezoelectric elements and their respective bracket members.

Accordingly, the mirror 13 is rigidly supported through the piezoelectric elements connected to the brackets extending from the mirror, while the piezoelectric elements are supported from frames 41 and 42 which, in turn, are supported from the telescope housing.

By now appropriately exciting the piezoelectric elements, the mirror 13 of FIGURE 2 can be caused to oscillate about either its center line 54 or its center line 55 where both center lines 54 and 55 are parallel to mirror 13 and are perpendicular to one another.

The piezoelectric elements 33 through 40 can be of any desired type such as a barium titanate or lead zirconite ceramic element which has been appropriately polarized. In FIGURE 3, the piezoelectric elements 39 and 40 are typically shown as being comprised of a body of the piezoelectric material where element 39 has electrodes 56 and 57 on its opposing surfaces which are connected to terminals 58 and 59 respectively. In a like manner, piezoelectric body 40 has electrodes 60 and 61 plated thereon which are connected to terminals 62 and 63 respectively. In operation and when, for example, terminal 58 is made positive with respect to terminal 59, body 39 will be caused to expand in a horizontal direction. Conversely, when terminal 59 is caused to be positive with respect to terminal 58, the body 39 will be caused to contract in a horizontal direction. The polarity of the exciting voltages applied to terminals 62 and 63 will always be such that when body 39 is caused to expand, body 40 will be caused to contract, and vice versa.

Referring now to FIGURE 6, I have illustrated the spatial relation of the eight piezoelectric elements 33 through 40 described above in FIGURES 2 through 5. In order to cause the mirror 13 to oscillate about its axis 54 of FIGURE 2 and thus, for example, establish an altitude axis in the system of FIGURE 1, the piezoelectric elements should be energized so that when elements 33, 37, 36 and 40 of FIGURE 6 expand, the elements 34, 38, 35 and 39 contract. Conversely, when polarity reverses the elements which previously operated in the expansion mode go into contraction while those elements previously in the contraction mode will go into expansion. Thus, by applying an alternating voltage to the various elements so as to cause the above noted interaction between the elements, there will be an oscillation of the mirror 13 about axis 54. It will be noted in all cases that the opposing piezoelectric elements must operate in opposite modes. That is to say, when one element of an opposing pair is expanding, the other must be contracting.

By causing the mirror 13 to oscillate about axis 54, an altitude axis may be established for the light tracking device in the manner described in the above noted patent application Serial No. 47,837. In order now to establish an azimuth axis, the mirror 13 is to be oscillated about its axis 55 of FIGURE 2 so that azimuth tracking is established in the manner again as set forth in application Serial No. 47,837.

To cause the oscillation about axis 55 of FIGURE 2, and referring to FIGURE 6, piezoelectric elements 33, 35, 38 and 40 are all caused to expand, while elements 34, 36, 37 and 39 contract, and vice versa. By now causing the alternating voltage driving the piezoelectric elements to drive the elements in this mode, it will be clear that mirror 13 will oscillate about axis 55.

A typical electrical circuit for driving piezoelectric elements 33 through 40 for oscillation about either axis 54 or 55 is shown in FIGURE 7.

Referring now to FIGURE 7, I have schematically illustrated piezoelectric elements 33 through 40 as connected in an electrical circuit for driving the elements. Adjacent each of the elements, I have shown a double ended arrow wherein the arrow heads point away from one another or toward one another to illustrate expansion and contraction respectively when the upper electrode is positive with respect to the lower electrode in the figure.

The A.-C. driving circuit includes a source of A.-C. voltage 70 which is connected to primary winding 71 of transformer 72. Transformer 72 has two secondary windings 73 and 74 whose polarities are illustrated by the normal conventional dot. Winding 73 is connected in parallel with piezoelectric elements 33, 34, 39 and 40 so that when the top of winding 73 is positive, elements 33 and 40 will expand, while elements 39 and 34 will contract. Conversely, when the top of winding 73 is negative, elements 33 and 40 will contract, while elements 39 and 34 will expand.

Secondary winding 74 is connected through a phase reversing switch 75 which includes two pole relay contacts 76 and 77. Relay contacts 76 and 77 are positioned in accordance with the energization of their relay coil 78 which is energized by a D.-C. source 79 when switching device 80 is closed.

Switching device 80 can be an electronically timed switching means whereby relay contacts 76 and 77 are in the upper position shown for a first predetermined interval of time, and are thereafter moved to the lower position to reverse the phasing of the circuit when switching means 80 is closed and relay coil 78 is energized.

The winding 74 is thus adjustably connected in phase to the piezoelectric elements 37, 35, 38 and 36 whereby when relay coil 78 is not energized and contacts 76 and 77 are in the position shown, when the top of winding 74 is positive, there will be expansion of piezoelectric elements 37 and 36 and contraction of piezoelectric elements 35 and 38. Conversely, when winding 74 is negative at the top, there will be a contraction of elements 37 and 36 and expansion of elements 35 and 38.

When switch 80 is closed, and the phasing of winding 74 is reversed with respect to the piezoelectric elements, there will be a reversal of the functions illustrated above.

In operation, and with the relay contacts 76 and 77 in the position shown, elements 33, 40, 37 and 36 all expand or contract with one another, while elements 39, 34, 35 and 38 will contract or expand with one another, the motion of the latter group of elements always being opposite to the motion of the first named group of elements. Thus, oscillation of mirror 13 about axis 54 is established to cause tracking in altitude.

When the phase reversal means 75 of FIGURE 7 is caused to operate, however, elements 33, 40, 35 and 38 will all either expand or contract with one another, while the remaining elements will all either contract or expand with one another, always being opposite in their mode of operation to the first mentioned group.

Accordingly, when relay contacts 76 and 77 are in their lower position so that the polarity of winding 74 is reversed with respect to winding 73, there will be an oscillation of the mirror 13 of FIGURE 2 about its axis 55 in order to establish an azimuth scanning direction.

While I have described my novel structure in FIGURES 2 through 7 as utilizing piezoelectric elements, it will be apparent that any type of transducer means could be utilized such as a magnetostrictive type device.

Many other types of piezoelectric driving means could be provided where the number of piezoelectric elements is less than the number shown in FIGURES 2 through 7.

By way of example, and as is shown in FIGURES 8 through 10, the mirror 13 can be alternately oscillated about mutually perpendicular axes by four piezoelectric elements.

Referring to FIGURES 8, 9 and 10 where elements similar to those of FIGURES 2 through 6 have been given like identifying numerals, the mirror 13 has a U-shaped bracket 90 secured to the rear surface thereof as by cementing, the bracket 90 having opposing sets of circular depressions 91, 92 and 93 therein, each of which are similar, for example, to opposing depressions 32a and 32b of FIGURE 3.

The first of the opposing depressions 92 is positioned at the intersection of axes 54 and 55 about which the mirror will be oscillated, and a pair of opposing support members 94 and 95, shown in FIGURES 9 and 10, which are carried from the support frames 96 and 97 respectively, engage these circular depressions.

Members 94 and 95 are not piezoelectric elements, and are merely structural support members which have a nose construction similar to the nose construction shown for piezoelectric elements 39 and 40 of FIGURE 3.

A pair of opposing piezoelectric elements 98 and 99 which are also carried from frame members 96 and 97 respectively are positioned above elements 94 and 95 and on the axis 54, as shown in FIGURES 8 and 9.

In a similar manner, a second pair of opposing piezoelectric elements 100 and 101 which seat in opposing openings 93 of FIGURE 8, and are shown in FIGURE 10, are provided in the side of elements 94 and 95 and along the axis 55. Accordingly, by energizing elements 98 and 99 so that one expands while the other contracts, the mirror 13 can be oscillated about axis 55 with opposing elements 94 and 95 and opposing piezoelectric members 100 and 101 which are deenergized during this mode of operation, serving as a pivot for the mirror 13.

Conversely, and by only energizing opposing elements 100 and 101, while elements 98 and 99 are deenergized, the mirror 13 will be oscillated about axis 54 with the opposing elements 98 and 99 and 94 and 95 serving as a pivot for this motion.

Accordingly, oscillation about the two mutually perpendicular axes of the mirror can be accomplished by this relatively simple mounting structure which serves to mount the mirror from the telescope housing.

The energizing circuit for energizing piezoelectric elements 98, 99, 100 and 101 is shown in FIGURE 11 where an A.-C. source 102 is connected to primary winding 103 of transformer 104, which has a center tap secondary winding 105. Each of the leads of secondary winding 105 is connected to one pole of a three-pole relay which includes relay contacts 106, 107 and 108 which are operated under the influence of a relay winding 109 connectable to a voltage source 110 through switching means 111.

The switching means 111 will be identical to switching means 80 described in FIGURE 7. When the relay contacts 106, 107 and 108 are in the position shown, they connect piezoelectric elements 98 and 99 across respective halves of secondary winding 105, piezoelectric elements 100 and 101 being deenergized at this time. Thus, the mirror will be oscillated about axis 55 when the relay contacts are in the position shown in FIGURE 11.

When the relay contacts are now caused to operate to their second position, as by closing switch 111 and energizing coil 109, piezoelectric elements 98 and 99 are disconnected from secondary winding 105, and elements 100 and 101 are connected to the secondary winding so that there will be oscillation of mirror 13 about axis 54.

Accordingly, by synchronously operating switch 111, the mirror will cause tracking in altitude and then in azimuth in a synchronous manner. Clearly, the servo system for controlling the telescope position will also be operated from altitude to azimuth operation depending upon the condition of switching means 111.

It is to be noted that in the foregoing, the light scanning means can be positioned directly at the aperture position, and can be arranged to have a photosensitive surface, or light accepting area equal in cross section to the area of the image. Thus, the fixed aperture plate and collecting means of FIGURE 1 could be eliminated.

In the foregoing I have described the light diverting means as comprising a reflecting surface such as a mirror which is oscillated to cause optical vibration of the image which is to be scanned. It will be understood that other oscillated light diverting means could be used. By way of example, a lens could be oscillated by a transducer system of the type described to cause the image formed by the lens to oscillate about the optical axis of a straight telescope housing. That is to say, with a vibrating lens, the housing 10 of FIGURE 1 would be an elongated tube with the light sensing means 18 aligned directly along the physical center of the telescope housing. As an alternate modification of the light diverting means a first wedge which may be vibrated by an oscillating system of the type described may be placed in front of a fixed wedge to form an obliquely oriented plano-parallel plate of variable thickness.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claim.

I claim:

A light scanning system for a light tracking system comprising telescope objective means for gathering the light of a light source to be tracked, a light diverting means positioned to receive the light gathered by said telescope objective means, a light sensing means, and an oscillating means; said oscillating means being connected to said light diverting means and being operable to oscillate said light diverting means; said light diverting means being operable to direct light impinged thereon toward said light sensing means; oscillation of said light diverting means causing said image to oscillate with respect to said light sensing means; a relatively fixed aperture; said relatively fixed aperture being positioned between said light diverting means and said light sensing means and at the focal plane of said telescope objective; said light diverting means including a reflecting surface; said oscillating means being operable to oscillate said reflecting surface about a first and second axis; each of said first and second axes being parallel to the plane of said reflecting surface; said first and second axes being at an angle with respect to one another; the image formed by said objective falling on said aperture when said oscillating means is at a rest position and the object being tracked is aligned with the axis of said telescope objective.

References Cited in the file of this patent

UNITED STATES PATENTS

| | | |
|---|---|---|
| 1,648,058 | Parker | Nov. 8, 1927 |
| 1,980,888 | Thomas | Nov. 13, 1934 |
| 2,489,305 | McLennan | Nov. 29, 1949 |
| 2,513,367 | Scott | July 4, 1950 |
| 2,920,529 | Blythe | Jan. 12, 1960 |
| 2,923,202 | Trimble | Feb. 2, 1960 |
| 2,939,962 | Miller | June 7, 1960 |
| 2,947,872 | Carbonara et al. | Aug. 2, 1960 |
| 3,020,414 | McKnight et al. | Feb. 6, 1962 |
| 3,038,079 | Mueller | June 5, 1962 |